Figure 1:
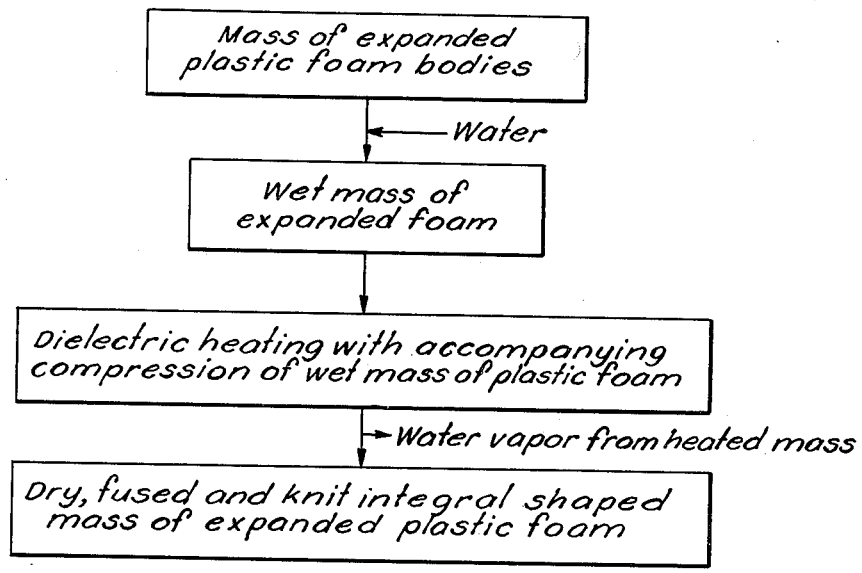

Oct. 30, 1962     J. D. KLINK ET AL     3,060,513

FABRICATION OF CELLULAR PLASTIC BODIES

Filed Dec. 21, 1959

INVENTORS.
John D. Klink
Frank H. Justin

BY
AGENT

… …

United States Patent Office 3,060,513
Patented Oct. 30, 1962

3,060,513
FABRICATION OF CELLULAR PLASTIC BODIES
John D. Klink, Marquette, and Frank H. Justin, Midland, Mich., assignors to The Dow Chemical Company, Midland, Mich., a corporation of Delaware
Filed Dec. 21, 1959, Ser. No. 860,768
8 Claims. (Cl. 18—48)

This invention relates to an improved method for the fabrication into various shaped and molded articles of particulate bodies of expanded thermoplastic resinous materials or plastic foams.

Pursuant to the known art, a variety of thermoplastic polymeric and resinous materials may be expanded from a granular or bead form to assume a porous, cellular, solidified foam-like structure by the action of various propellants or agents for expanding or blowing the materials. The blowing agents, in accordance with common practice, are usually gases (or gases generating substances) or highly fugacious liquids which have been dissolved or otherwise intimately incorporated within the thermoplastic resinous material while it is in an unexpanded granular form. The application of heat to an unfoamed or incompletely foamed granular thermoplastic resinous material containing a blowing agent causes the blowing agent to be released or thermally expanded, or both, while the thermoplastic material is attaining a foaming temperature at which it is sufficiently softened and yieldable to permit the pressure of the thermally expanding blowing agent to form it into the desired foam structure.

The heat energy which is required to soften the resinous material and expand the blowing agent for the foam-forming function is conventionally derived from an externally generated source. Thus steam, hot air, heated baths, radiant heat and other heat supplying means are ordinarily employed for the purpose of foaming the expandable thermoplastic resinous material.

Many expandable thermoplastic resinous materials have the potential for being expanded to a foamed volume which may occupy as much as 30 or 40 to as much as 200 and more times their original volume in an unfoamed and completely unexpanded condition. This is particularly the case when "cycle-foaming" procedures are utilized for the preparation of greatly expanded, extraordinarily low density, plastic foam. Such procedures may advantageously be in accordance with the disclosure that is contained in the copending application for United States Letters Patent having Serial Number 611,683, which was filed on September 24, 1956, by William J. McMillan and Keith R. Denslow for a Cycle Foaming Method of Making Cellular Plastic Bodies, now United States Letters Patent No. 2,884,386. Essentially, in such a cycle-foaming procedure, the foamed volume of an already expanded closed cell plastic foam (which contains entrapped within its cells a residue of the primary blowing agent that was utilized and which is a non-solvent or poor solvent for the plastic) may be increased by heating the plastic foam to a thermally plasticizing temperature for a time sufficient to plasticize the resin but below a temperature at which the foam would be collapsed or the plastic resin decomposed to expand the foam mass; then cooling and exposing said heat expanded mass to an atmosphere of a gas, preferably air, that has a permeability rate greater than the permeability rates of the primary propellant that constitutes or was derived from the initially employed blowing agent through the cell walls of the foamed mass; and subsequently repeating said cycles of heating and cooling with exposure to an atmosphere of said second more permeable gas for a plurality of cycles whereby the volume of the foamed mass is continually increased to a desired volume in excess of that which is ordinarily obtainable by conventional means from the thermal expansion of the primary propellant alone. In cycle-foaming, as has been described by McMillan and Denslow, it is preferable to employ dichlorodifluoromethane or the like gas as the primary propellant or blowing agent.

Given quantities of expandable thermoplastic resinous materials may be foamed or expanded according to conventional methods within a confining space, such as a mold form, to provide various shaped articles that may be desired as plastic foam products. Due to the usually low heat conducting properties of thermoplastic resinous materials and their greatly increased thermal insulating characteristics during their transformance into and assumption of a cellular foam structure, however, the foaming of expandable thermoplastic resinous materials by the application of heat energy derived from externally generated sources introduces many operational difficulties and is frequently responsible for various dissatisfactory results especially when low density, fabricated plastic foam articles are desired. In many instances, the resulting foam structure may be insufficiently expanded or formed with an excessive nonuniformity, or both, and may be produced with other undesirable features and marks of poor quality. This may be particularly prevalent when foam structures having substantial thicknesses are attempted to be formed. In other instances, uniform control of the expanding structure during its formation is not easy to maintain. This may even be the case when the heat supplying means are passed internally within the material being foamed, as when steam probes and the like are utilized in foam-molding apparatus.

In addition, the usual foam-producing and foam-forming or molding apparatus is relatively complex, inconvenient to handle and expensive to construct and operate, often because of certain included features which are designed to facilitate the heating of the thermoplastic resinous material being expanded. Furthermore, it is a common experience to encounter residues of the heat supplying means in the foam structure after its formation, as when steam is employed and the foamed article is found to be wet with the water of condensation.

For reasons that are very much the same or analogous to those that have been mentioned in the foregoing, even greater difficulty is generally encountered in suitably fabricating particulate, expanded plastic foam bodies into various shaped articles in which the individual bodies are fused together to form the integral shaped mass. The difficulty, mostly due to the tremendous insulating characteristics of the plastic foam, increases in practically direct proportion to the decreasing density of the foam. When some low density plastic foam bodies are attempted to be fused together in a mold form by conventional means, for example, it is literally impossible to achieve suitable thermal conditions in the center of the mass in order to accomplish the desired result, due to the indicated insulating property of the foam.

Bonding or knitting together of the expanded particles is particularly difficult in instances wherein expanded particles having a density of one half pound per cubic foot or lower are employed.

It would be advantageous to obviate these and other difficulties in the fabrication of expanded foam articles that consist of thermoplastic resinous materials.

Therefore, it is among the principal objects of the present invention to provide an improved method for fabricating expanded bodies of thermoplastic resinous materials or plastic foams. It is a related object to provide a method which does not depend on the use of heat energy transferred from externally heated or generated heat supplying materials in order to accomplish the fabrication of particulate plastic foam bodies into tightly knit, well fused and bonded, shaped integral foam masses. A further object is to provide a facile method whereby foamed articles and structures having improved and uniform characteristics can be obtained readily. A still further object is to provide a method of preparing shaped objects from expandable particulate resins having a density less than about 0.5 pound per cubic foot. Other objects and advantages will be more apparent in the following description and specification.

According to the method of the present invention, plastic foam bodies or thermoplastic resinous materials in expanded, particulate form may be readily fused together and fabricated into an integral, shaped foam structure by wetting the mass of plastic foam bodies with water; placing the wet mass of plastic foam in (or passing them through) a shrinkable, retractable or progressively constricting mold form; and dielectrically heating the wet mass to generate sufficient heat within the mass, to adequately soften the mass and cause fusion of the expanded particles in the mass without collapse of the foam structure while it is being compressed or urged together in said mold form to knit the particulate foam bodies coherently together while vaporizing the water from the mass. The dielectric heating is continued until the mass is dry and the plastic foam bodies have been thoroughly fused and knit together to form the desired shaped integral mass in the mold form. Advantageously, the wet mass may be formed while being dielectrically heated within a mechanically retractable or shrinkable mold form or while passing or being passed through a progressively constricting or compressing passageway or the like in order, for example, to form sheets, planks or other shapes of the plastic foam. In many instances it may be particularly advantageous for it to be formed while being dielectrically heated within an enveloping layer of a shrinkable material, such as a saran plastic wrapping (which shrinks upon being heated) or a rubber or other elastomeric tube or other form which is adapted to maintain the mass under a uniform and continuous restraint during its fusion and fabrication into an integral foam structure.

The method of the invention is particularly advantageous when employed in the fabrication of shaped articles or expanded masses having a density below about 0.5 pound per cubic foot such as from about 0.2 pound per cubic foot to about 0.45 pound per cubic foot.

Figure 2:
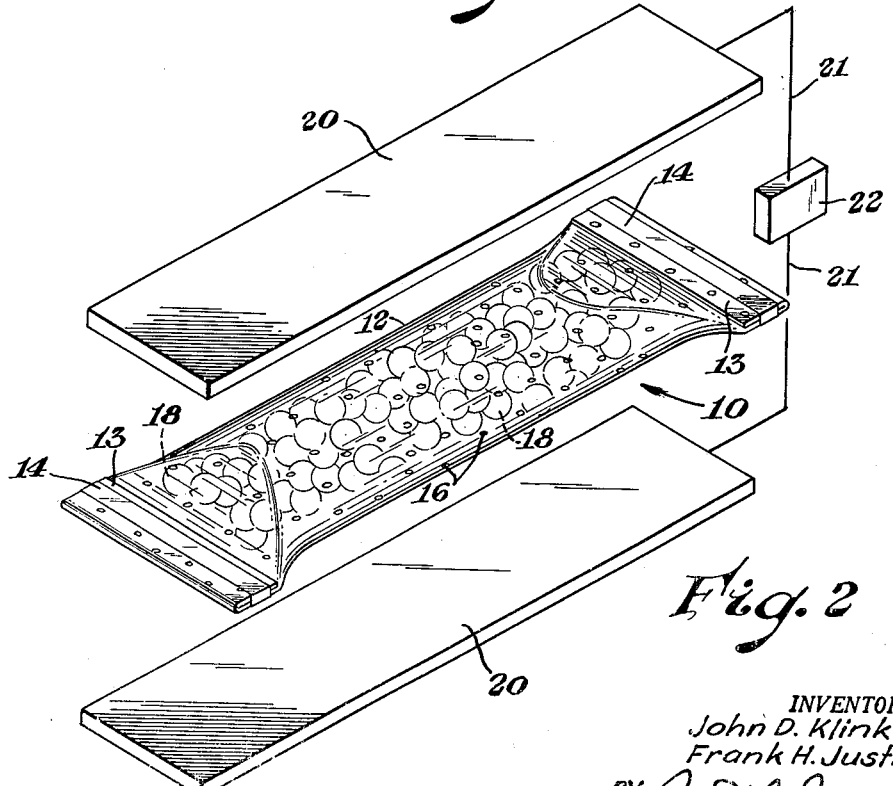

FIGURE 1 is a flow sheet of the process; and FIGURE 2 schematically represents a mold in accordance with the invention. The mold is generally indicated by the reference numeral 10. A sheet of shrinkable thermoplastic resinous material 12 is folded into generally tubular shape and the ends 13 secured with masking tape 14. The sheet 12 forming the mold 10 has vent holes 16 in full communication with both sides of the sheet. Contained within the mold 10 are expanded thermoplastic particles 18. The mold 10 containing particles 18 is positioned between electrodes designated by the reference numbers 20. The electrodes 20 are supplied through conductive means 21 (such as wires, bus bars or the like) with a source of high frequency alternating current 22.

Foam structures which are formed in accordance with the method of the present invention have a high degree of uniformity and, even when they have been fabricated from extremely low density foam, have an integral foam structure which is evenly and uniformly distributed in the shaped mass. The foam structures may be obtained with such characteristic features even when they have been fabricated into conformations having substantial cross-sectional dimensions which, for example, may include a thickness of several inches or more, if desired.

The water which is employed for wetting the expanded bodies of thermoplastic resinous material in the method of the invention facilitates the securing of an optimum foaming temperature for expanding the thermoplastic resinous material by means of dielectric heating. Temperatures in excess of 212° F. may be achieved readily by the pressure effect which may be obtained with various types of confining molds. The presence of the water also prevents any deleterious overheating effects from occurring in the expanding thermoplastic resinous material by means of the application of dielectric heat.

The amount of water which may be employed for wetting the expandable thermoplastic resinous material depends somewhat on the quantity of heat which is required by a given mass of the material in order to bring it to the optimum fusion temperature for fabrication which usually is in the neighborhood of about 200–260° F. in order to bring about the knitting together in the suitably heat softened, expanded material so as to accomplish the desired fabrication. Enough water should be employed to provide a suitable dielectric loss factor in the wet mass that is to be dielectrically heated so that an efficient and effective heating may be realized. There should also be enough water present in the material to absorb sufficient heat through its vaporization during the required period of dielectric heating for the fabrication so that the expanded thermoplastic resinous material is prevented from thermally collapsing, degrading or decomposing. Certain types of commonly utilized expandable thermoplastic resinous materials may be affected adversely in this manner when they are subjected to temperatures, for example, in the range from about 275° F. to 400° F. Conversely, excessive amounts of water should be avoided so as to preclude an incomplete vaporization within the dielectric heating period of substantially all of the water from the formed foam structure.

Ordinarily, the amount of water which is employed should not be in excess of an amount sufficient to provide about 60 percent by weight of water in the wet expanded material. Frequently, an amount of water in the neighborhood of about 30 percent by weight of the wet particles of expanded thermoplastic resinous material being fabricated may be employed suitably. It is preferable (and necessary for optimum results) to thoroughly and uniformly wet the plastic foam material with the water. In some cases it may be expedient to mix the mass of expandable material and the water before it is put in the mold, and it may frequently be preferred to employ a detergent or surfactant material in the water as to assist in the wetting of the plastic foam bodies that are to be fabricated into shaped, integral foam masses. In this connection, aqueous solutions of glycols and other non-harmful materials that raise the boiling point of the water may also be employed in place of water alone. Such aqueous solutions may be of especial benefit and advantage when plastic foam bodies that consist of relatively high-melting or fusing materials are being bonded together and fabricated into integral shaped masses.

The plastic foam bodies that are utilized for the fabrication of integral masses may have any desired configuration including relatively large particulate shapes. It is preferable, however, to employ the expanded foam material that is to be fabricated when it is in the form of a plurality of particulate bodies that, desirably, may have granular shapes such as plastic foam bodies that have been expanded from beads or granules of expandable thermoplastic resinous material. Particulate expanded foam bodies, especially those having a size roughly from a quarter to three-quarters of an inch or an inch or so can be easily and conveniently handled in order to facilitate their placement in the mold form that is utilized. Cycle-foamed bodies of plastic foam are generally found to accommodate the realization of utmost benefit and satisfaction in the practice of the present invention.

Any thermoplastic resinous material which can be expanded or foamed by conventional or specialized techniques to provide plastic foam bodies may advantageously be used for the plastic foam that is utilized in the practice of the invention. Many plastic foams of various thermoplastic resinous materials are thus suitable. Expandable thermoplastic polymers, copolymers and interpolymers or graft copolymers of styrene, alpha-methyl styrene, ar-methyl styrene (vinyltoluene), mono and dichlorostyrene and ar-dimethyl styrene may be utilized with especial advantage in the plastic foams, as may other alkenyl aromatic resinous materials and compounds. As is well understood in the art, alkenyl aromatic compounds are these containing at least about 50 percent by weight of at least one alkenyl aromatic compound having the general formula G—CX=$CH_2$ wherein G is an aromatic radical and X is selected from the group consisting of a hydrogen atom and a methyl radical. Plastic foams of other thermoplastic resinous materials may also be utilized with advantage including polymers and various copolymers of methyl methacrylate, ethyl acrylate and the like, vinyl acetate, vinyl butyral and the like, hydrocarbon polyolefins including polyethylene and the like, and various thermoplastic or thermoplastified derivatives of cellulose including cellulose nitrate and cellulose acetate. The blowing agents employed for the initial preparation of the expanded thermoplastic resinous bodies may be those which are commonly utilized, including dichlorodifluoromethane, carbon dioxide, pentane and the like as well as other suitable materials such as suitable gas generating agents.

It is generally preferable to employ construction materials for the shrinkable molds 10 or other compressing means which have electrical insulating or non-conducting characteristics. Metal parts may be provided in molds 10 or progressively constricting passageways if they are designed to avoid shorting out the high frequency field. In such cases it is advantageous to heat the metal portion of the mold to avoid condensation on its surface.

Advantageously, as has been indicated, a uniform pressure on the individual particles of the expanded mass of thermoplastic resinous material may be achieved by the utilization of a shrinkable plastic or rubber envelope about the plastic foam bodies as the mold form. Such mold forms insure the uniform distribution and compression of individual particles of the mass of plastic foam bodies during their fusion and fabrication into a foam structure by tending to maintain the mass under a constant and uniform pressure or restraint during the operation. The shrinkable mold forms 10 give best results when they are charged substantially full of the plastic foam bodies 18 that are to be fabricated.

Such mold forms 10 may advantageously be made of such heat shrinkable plastic films as the various saran films, which can contract about and uniformly compress the plastic foam bodies while they are being fused together and fabricated. These shrinkable forms may have any desired configuration for compressing the plastic foam mass, although frequently a bag or tube-like shape is suitable. The shrinkable molds 10 should be adequately vented to accommodate escape of the steam from the wet expanded mass during its dielectric heating. The position of the vents 16 depends in a large measure on the particular shape of the mold form and individual requirements for attaining its efficient venting. The venting of the mold may be continuous during the period of dielectric heating or it may be a delayed venting, as may be accomplished with pressure responsive vents, to permit a desired pressure to be attained before the venting is afforded. Such a technique may provide a greater uniformity in certain molded shapes. In this connection, the use of a positive vacuum on a shrinkable rubber mold form may magnify its potential for compressive contraction during the fabrication of the enveloped plastic foam bodies. In addition, it is often beneficial for certain molds, such as those made of wood or other materials having a high dielectric loss factor and substantial moisture permeability, to be wet before the plastic foam mass is dielectrically heated within them. This assists in obtaining more uniform moldings by permitting the mold form to be uniformly heated with the molding and also by preventing its becoming burned during the dielectric heating.

Even in instances where it may be desirable for the foam structure to have the more exact shape of a rigid mold, the method of the invention can be practiced with the additional benefits which are obtainable from the employment of shrinkable rubber or plastic mold forms. This may be accomplished by dielectrically heating the wet mass of expanded thermoplastic resinous material while it is contained in a shrinkable, enveloping mold form which is placed within the cavity of a rigid mold. This allows the expanded thermoplastic resinous material to be formed into a foam structure having a relatively more precise definition and outline than is usually obtainable with a shrinkable mold form alone, while retaining the beneficial influence of a shrinkable mold form for the foam structure being fabricated.

The dielectric heating apparatus 22 which is employed in the practice of the present invention may be of the usually available type which is operated in a conventional manner. Alternating currents from suitable generating sources having frequencies between about 2 and 1,000 megacycles may be employed, although frequencies between about 6 and 100 megacycles are more commonly utilized. Any desired voltage may be used. Ordinarily it is preferable to employ voltages which are not in excess of about 25,000 volts. As is commonly understood, the heat liberated in a dielectric substance (such as a wet mass of plastic foam bodies) by a changing electric field depends on the dielectric loss factor of the particular mass being heated and is proportional to the frequency of the electrical supply and to the square of the impressed voltage. Hence, the fusion and fabricating rate may be governed by desired combinations of frequency and voltage, with care being taken to avoid excessive potentials which may overstress and puncture the material being expanded. In most instances the particulate mass of expanded thermoplastic resinous material can be rapidly fabricated into an integral foam structure by means of the dielectric heating. Frequently a heating period of only about a minute or so may be sufficient in order to suitably fabricate a foam structure, even when it is of relatively large size and thickness.

The invention is further illustrated in but not limited or otherwise restricted by the following examples.

*Example 1*

About equal volumes of physically differing plastic foam bodies (obtained by cycle-foaming expandable polystyrene granules containing about 10 percent by weight of dichlorodifluoromethane) were mixed together and thoroughly wet with about 30 percent by weight of water containing a minor proportion of a dissolved surfactant material. The expanded plastic foam bodies had a roughly granular form. The individual bodies in one of the volumes that were mixed had an average maximum dimension of three-quarters of an inch and a bulk density of about 0.2 pound per cubic foot. The bodies in the other volume had a mean diameter of about half an inch and a bulk density of about 1.03 pounds per cubic foot. Both were the product of a cycle-foaming of expandable polystyrene granules through four separate heating and cooling cycles (to about 250° F. and room temperature) at twelve hour intervals to attain greatly expanded foam structures. An end vented tube made from three wraps of 0.015 inch saran film and having a length of 6 inches with a diameter of about 3 inches was charged full with the mixture of the wet expanded bodies. The ends of the saran mold form were folded over after it had been charged. They were secured thus with masking tape which let loose to vent the mold after the material started to fuse during the dielectric heating. After being charged, the mold was placed between the elcetrodes of a conventional dielectric heating apparatus which was operated at a frequency of about 27 megacycles under an impressed voltage of about 8,000 volts. At the end of a 20-second heating period, the plastic bodies had fused together to form a well-knit, integral foam cylinder having a slightly smaller diameter. After cooling, it was removed and found to have a uniform foam structure of about 0.342 pound per cubic foot which was thoroughly dry and free from appreciable quantities of moisture. In comparison, a similar charge of plastic bodies in a conventional mold could not be satisfactorily fused together and fabricated to a shaped article by means of steam heating.

*Example 2*

A volume of plastic foam bodies (obtained by cycle-foaming expandable polystyrene granules containing about 5 percent by weight of pentane) was mixed with about 10 percent by weight of water containing a minor proportion of a dissolved surfactant material. The expanded plastic foam bodies had a roughly granular form. The individual bodies in the volumes had an average maximum dimension of three-eighths of an inch and a bulk density of about 0.25 pound per cubic foot. The bodies were a product of a cycle-foaming of expandable polystyrene granules through a heating and cooling cycle (to about 230° F. and room temperature) to attain greatly expanded foam structures. An end vented tube made from three wraps of 0.015 inch saran film perforated with $\frac{1}{16}''$ holes on $\frac{1}{2}''$ centers (square pattern) and having a length of 6 inches with a diameter of about 3 inches was charged full with the wet expanded bodies. The ends of the saran mold form were folded over after it had been charged. They were secured thus with masking tape. After being charged, the mold was placed between the electrodes of a conventional dielectric heating apparatus which was operated at a frequency of about 27 megacycles under an impressed voltage of about 8,000 volts. At the end of a 20-second heating period, the plastic bodies had fused together to form a well knit, integral foam cylinder having a slightly smaller diameter. After cooling, it was removed and found to have a uniform foam structure of about 0.25 pound per cubic foot which was thoroughly dry and free from appreciable quantities of moisture. In comparison, a similar charge of plastic bodies in a conventional mold could not be satisfactorily fused together and fabricated to a shaped article by means of steam heating.

This application is a continuation-in-part of our copending application, Serial No. 635,962, filed January 24, 1957 and now abandoned.

Various modifications may be made in the method of the present invention without departing from the spirit or scope thereof, and it is to be understood that we limit ourselves only as defined in the appended claims.

What is claimed is:

1. Method for fabricating an integral foam structure having a density of from about 0.2 to about 0.5 pound per cubic foot from expanded thermoplastic alkenyl aromatic resinous material in particulate form which comprises wetting a particulate mass of expanded thermoplastic material with water, containing said mass in a shrinkable mold form while being fabricated and then simultaneously compressing by means of said shrinkable mold form and dielectrically heating the wet mass to soften the mass and cause fusion of the expanded particles in the mass while it is being compressed to knit said mass coherently together while vaporizing the water from the mass.

2. The method of claim 1 wherein the shrinkable mold form is an enveloping layer of saran film about said particulate mass of expanded thermoplastic resinous material and said saran film being heat shrinkable at fabrication temperature.

3. The method of claim 1 wherein the particulate mass of expanded thermoplastic resinous material is wet with about 30 percent by weight of water, based on the weight of the wet mass.

4. The method of claim 1 wherein the particulate mass of expanded thermoplastic resinous material is comprised of at least two individual bodies that are to be joined.

5. Method for fabricating an integral foam structure from expanded thermoplastic alkenyl aromatic resinous material in particulate form which comprises wetting a particulate mass of expanded thermoplastic material with water, containing said mass in a shrinkable mold form while being fabricated and then simultaneously compressing by means of said shrinkable mold form and dielectrically heating the wet mass to soften the mass and cause fusion of the expanded particles in the mass while it is being compressed to knit said mass coherently together while vaporizing the water from the mass.

6. The method of claim 5 wherein the shrinkable mold form is an enveloping layer of saran film about said particulate mass of expanded thermoplastic resinous material and said saran film being heat shrinkable under the conditions of fabrication.

7. The method of claim 5 wherein the particulate mass of expanded thermoplastic resinous material is wet with about 30 percent by weight of water, based on the weight of the wet mass.

8. The method of claim 5 wherein the particulate mass of expanded thermoplastic resinous material is comprised of at least two individual bodies that are to be joined.

References Cited in the file of this patent

UNITED STATES PATENTS

| | | |
|---|---|---|
| 2,525,965 | Smith | Oct. 17, 1950 |
| 2,564,397 | Duddy | Aug. 14, 1951 |
| 2,818,905 | Simmonds et al. | Jan. 7, 1958 |
| 2,898,634 | Alderfer | Aug. 11, 1959 |
| 2,929,109 | Cresap | Mar. 22, 1960 |
| 2,951,260 | Harrison et al. | Sept. 6, 1960 |